(12) United States Patent
Cherukupalli et al.

(10) Patent No.: US 10,731,897 B1
(45) Date of Patent: Aug. 4, 2020

(54) MOUNTING SYSTEMS FOR SECURING A SOLAR ARRAY AND CLAMPING SYSTEMS THEREOF

(71) Applicant: FTC Solar, Inc., Austin, TX (US)

(72) Inventors: Nagendra Cherukupalli, Cupertino, CA (US); Milo Zabala, Concord, CA (US); Rechel Cruz, Centennial, CO (US)

(73) Assignee: FTC Solar, Inc., Austin, TX (US)

( * ) Notice: Subject to any disclaimer, the term of this patent is extended or adjusted under 35 U.S.C. 154(b) by 0 days.

(21) Appl. No.: 16/562,933

(22) Filed: Sep. 6, 2019

Related U.S. Application Data

(63) Continuation of application No. 16/375,299, filed on Apr. 4, 2019, now Pat. No. 10,443,895.

(51) Int. Cl.
*H02S 20/00* (2014.01)
*F24S 25/634* (2018.01)
*F24S 25/30* (2018.01)
*F24S 25/60* (2018.01)

(52) U.S. Cl.
CPC ............. *F24S 25/634* (2018.05); *F24S 25/30* (2018.05); *H02S 20/00* (2013.01); *F24S 2025/6002* (2018.05); *F24S 2025/6003* (2018.05)

(58) Field of Classification Search
CPC .. F24S 25/634; F24S 25/63; F24S 2025/6002; F24S 2025/6003; F24S 25/30; H02S 20/00
See application file for complete search history.

(56) References Cited

U.S. PATENT DOCUMENTS

| | | |
|---|---|---|
| 2010/0219309 A1 | 9/2010 | Hermann et al. |
| 2011/0000525 A1 | 1/2011 | Wu et al. |
| 2011/0147553 A1 | 6/2011 | Ostermeier et al. |
| 2013/0048056 A1 | 2/2013 | Kilgore et al. |
| 2013/0192150 A1 | 8/2013 | DuPont et al. |
| 2014/0102016 A1 | 4/2014 | Hemingway |
| 2017/0194902 A1 | 7/2017 | Meine et al. |
| 2019/0154306 A1 | 5/2019 | Rothschild |

FOREIGN PATENT DOCUMENTS

WO 2013085776 A2 6/2013

*Primary Examiner* — Gisele D Ford
(74) *Attorney, Agent, or Firm* — Armstrong Teasdale LLP (57) ABSTRACT

Mounting systems for securing a solar array to a mounting frame and clamping systems thereof are disclosed. The clamping systems may include one or more hooks for connecting a solar panel module to mounting frame. The hooks may be disposed on one or more wings of a clamp plate that extend from a rail structure of the clamp plate. The rail structure may form a rail chamber which receives a mounting rail.

12 Claims, 11 Drawing Sheets

MOUNTING SYSTEMS FOR SECURING A SOLAR ARRAY AND CLAMPING SYSTEMS THEREOF

CROSS-REFERENCE TO RELATED APPLICATION

This application is a continuation of U.S. Non-provisional patent application Ser. No. 16/375,299, filed Apr. 4, 2019, which is incorporated herein by reference in its entirety.

FIELD OF THE DISCLOSURE

The field of the disclosure relates to mounting systems for securing a solar array and to clamping systems thereof. The clamping systems may include one or more hooks for connecting a solar panel module to a mounting frame.

BACKGROUND

Solar arrays are devices that convert light energy into other forms of useful energy (e.g., electricity or thermal energy). One example of a solar array is a photovoltaic array that converts sunlight into electricity. Photovoltaic array assemblies include a photovoltaic panel module that is connected to a mounting frame. The mounting frame supports the modules of the photovoltaic array and connects the modules to an anchoring structure.

Conventionally, several tools are needed to connect the photovoltaic panel modules (e.g., pliers, adjustable wrenches, screwdrivers, pneumatic tools and a compressor, and rivets) to the mounting frame and the modules are connected to the frame by two or more users. The mounting system may also include one or more separate parts (e.g., separate fasteners) that are used to mount the module in the field such as clips, bolts, nuts, screws and the like. Use of separate tools and parts for mounting the solar panel module to the mounting frame in the field adds complexity and time to the mounting process.

A need exists for mounting systems that enable photovoltaic panel modules to be connected to the mounting frame with less or no tools and/or that allow the modules to be connected by a single user.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

One aspect of the present disclosure is directed to a clamping system for connecting a solar panel module to a mounting frame. The clamping system includes a clamp plate having a rail structure that defines a rail chamber for receiving a frame member of the mounting frame. The clamping system includes a hook disposed laterally outward from the rail structure for connecting the solar panel module. The clamping system includes a first clamp fastener for connecting the clamp plate to the frame member and a second clamp fastener for connecting the clamp plate to the frame member.

Another aspect of the present disclosure is directed to a mounting system for securing a solar array that comprises one or more solar panel modules. The mounting system includes a mounting frame for supporting the solar array. The mounting frame includes a torque rail and a mounting rail disposed on and orthogonal to the torque rail. The mounting system includes a clamping system for connecting one or more solar panel modules to the mounting frame. The clamping system includes a clamp plate having a rail structure that defines a rail chamber. The mounting rail is received in the rail chamber. The clamp plate includes a hook disposed laterally outward from the rail structure for connecting a solar panel module.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

Figure 1:
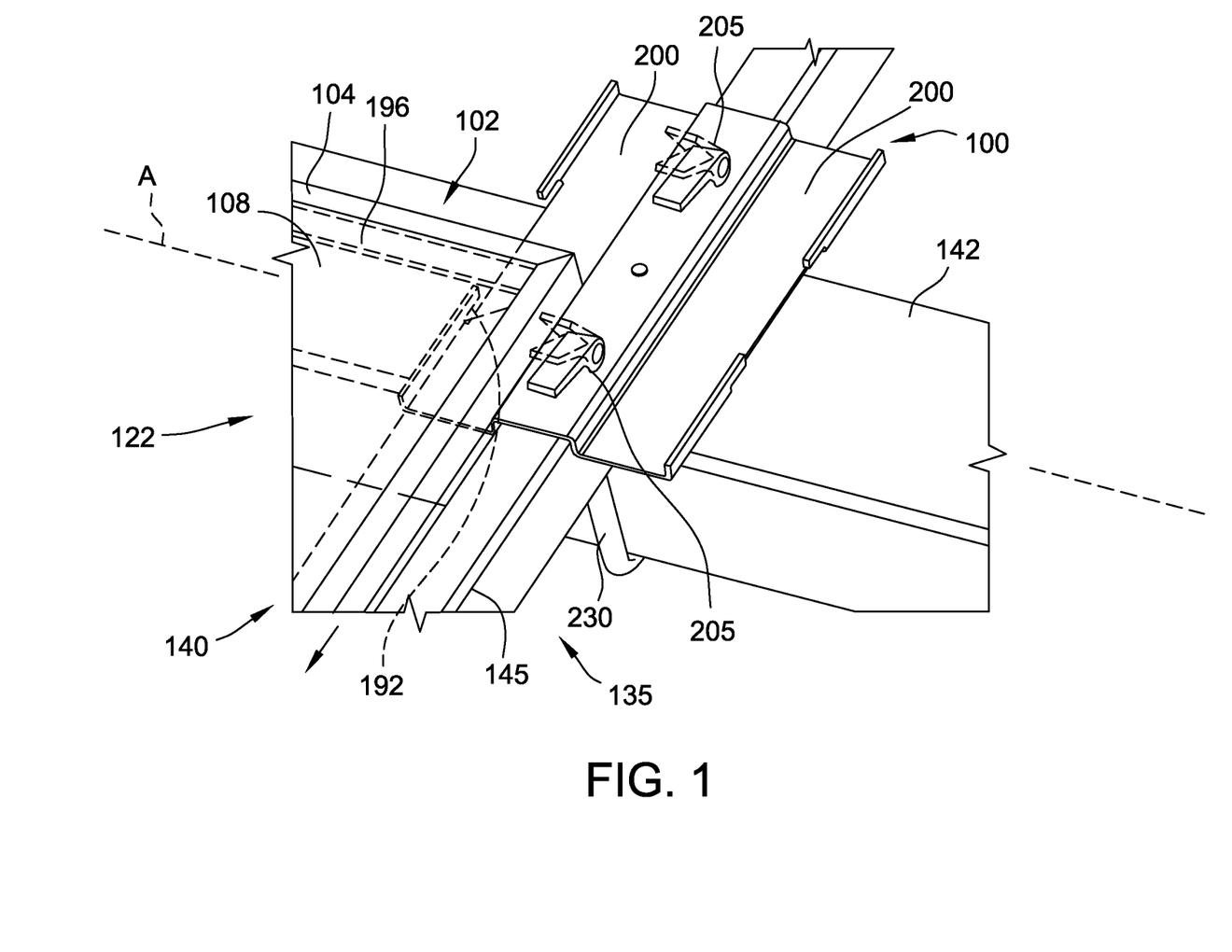
FIG. 1 is a perspective view of a solar panel module, mounting frame and a clamping system for connecting the solar panel module to the mounting frame.

A clamping system 100 for connecting a solar panel module 102 to a mounting frame 135 is shown in FIG. 1. The clamping system 100 includes one or more hooks 125 that connect to the solar panel module 102. The clamping system 100 may be secured to a mounting frame 135 by one or more clamp fasteners 205.

Figure 2:
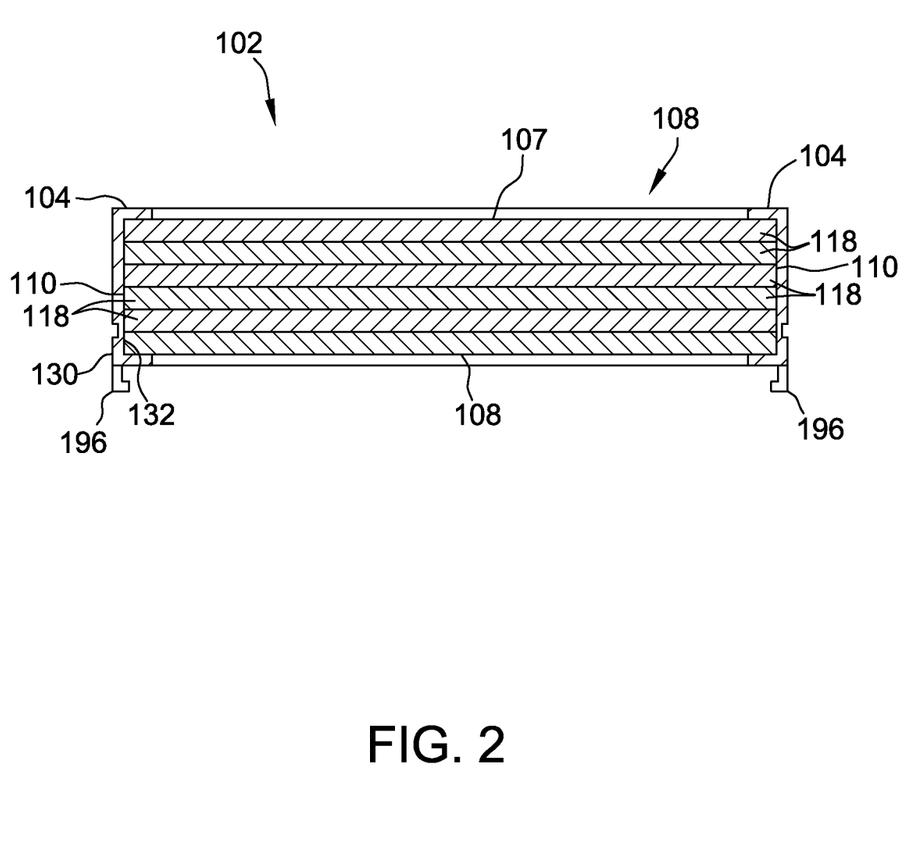
FIG. 2 is a cross-sectional view of a solar panel module.

An example solar panel module 102 which may be secured by the clamping system is shown in FIGS. 1 and 2. The solar panel module 102 includes a frame 104 that circumscribes and supports a solar panel 108. The frame 104 is connected to the solar panel 108 and protects the edges 110 of the solar panel 108. The frame 104 includes an outer surface 130 spaced from the solar panel 108 and an inner surface 132 adjacent to the solar panel 108. The outer surface 130 is spaced from, and substantially parallel to, the inner surface 132. The frame 104 may be made of any suitable material providing sufficient rigidity including, for example, metal or metal alloys, plastic, fiberglass, carbon fiber and the like. In some embodiments, the frame is made of aluminum, such as 6000 series anodized aluminum.

Figure 3:
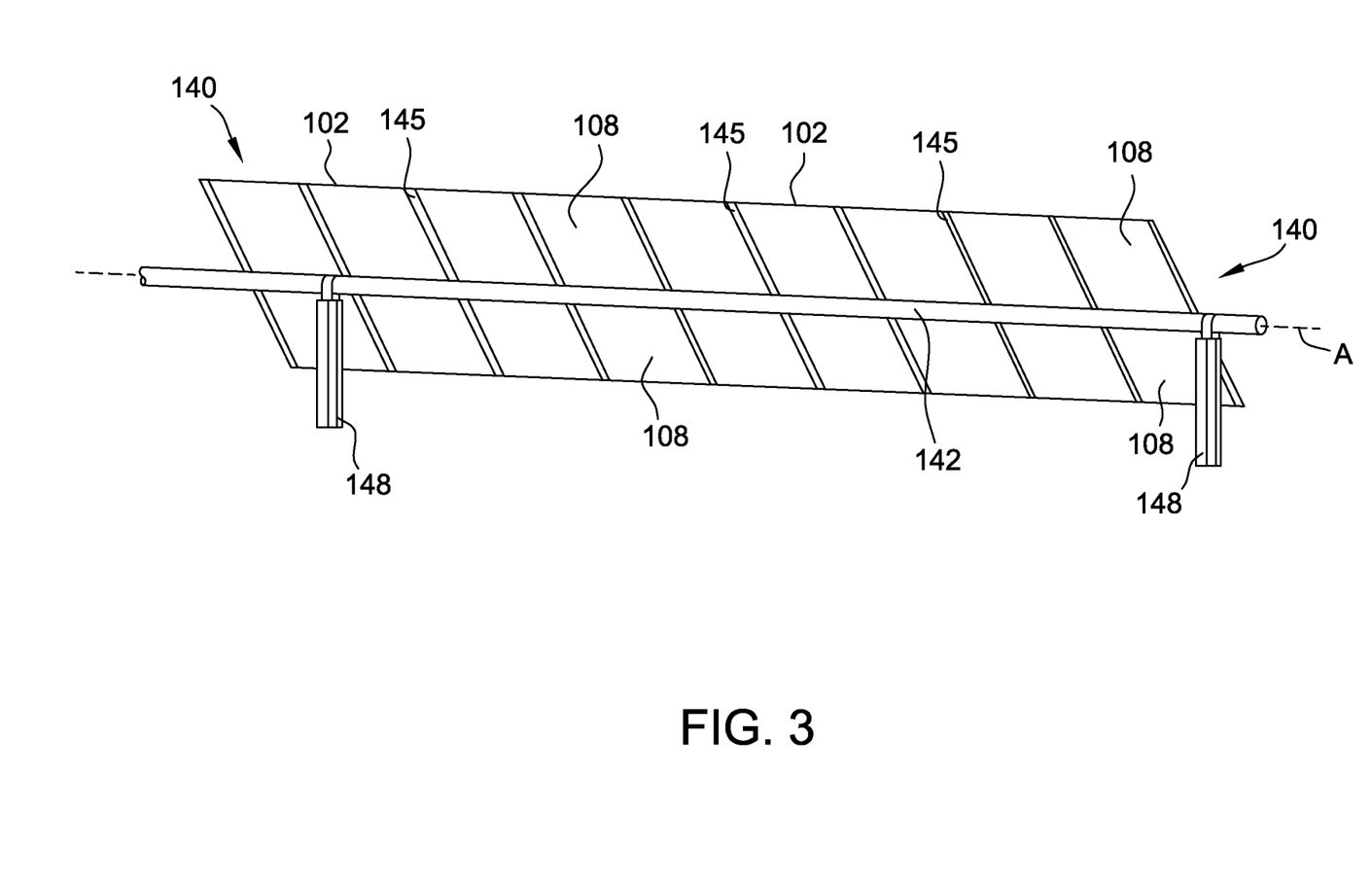
FIG. 3 is a front view of a solar panel array.

The solar panel 108 includes a top surface 107 and a bottom surface 109. First and second edges 110 extend between the top surface 107 and the bottom surface 109. The solar panel module 102 may have any shape that allows the solar panel module 102 to function as described herein. The illustrated solar panel module 102 is rectangular. The solar panel module 102 may be part of a solar array 140 (FIG. 3). The solar array 140 may include a plurality of solar panel modules 102 with each module 102 made of photovoltaic cells.

The solar panel 108 has a laminate structure that includes a plurality of layers 118. Layers 118 include, for example, glass layers, non-reflective layers, electrical connection layers, n-type silicon layers, p-type silicon layers, backing layers and combinations thereof. In other embodiments, the solar panel 108 may have more or fewer layers 118 than shown in FIG. 2, including only one layer.

The solar panel 108 may be a photovoltaic module having a plurality of photovoltaic cells which convert sunlight to electricity. In other embodiments, the solar panel 108 is a thermal collector that heats a fluid such as water. In such embodiments, the solar panel 108 may include tubes of fluid which are heated by solar radiation. While the present disclosure may describe and show a photovoltaic panel, the principles disclosed herein are also applicable to a solar array configured as a thermal collector unless stated otherwise.

Referring now to FIG. 1, the solar panel module 102 may be connected to a mounting frame 135 for supporting the one more solar panel modules 102 of the solar array 140. The clamping system 100 and mounting frame 135 may be components of a mounting system 122 for securing a solar array 140 (FIG. 3) that includes one or more of the solar panel modules 102. The mounting frame 135 may generally include any combination of frame members that allows the solar module 102 to be connected to an anchoring structure (e.g., anchoring structure mounted in the ground or to a rooftop or other structure). In the illustrated embodiment, the frame members of the mounting frame 135 include a torque rail 142 and mounting rail 145 disposed on the torque rail. The torque rail 142 may be caused to rotate to allow the array 140 to track the path of the sun. For example, a tracking system such as disclosed in U.S. Provisional Patent Application No. 62/727,216, filed Sep. 5, 2018, entitled "Tracking Systems for Adjusting a Photovoltaic Array", which is incorporated herein by reference for all relevant and consistent purposes, may be used to rotate the torque rail 142.

The torque rail 142 is pivotally connected to a support column 148 (FIG. 3). In the illustrated embodiment, the support column 148 is an I-beam post. Other support columns may be used in other embodiments (e.g., a tubular support column). The photovoltaic array 140 may be ground mounted or may be connected to another structure which supports the array (e.g., roof-top applications). The support column 148 is connected to a base (not shown) that anchors the array 140. In ground-mounted applications, the base may be a foundation which encases a portion of the support column 148 or the base may include brackets, fasteners or the like that connect to the support column 148. In some embodiments, the base may be a frame member (e.g., a horizontal rail that supports multiple arrays with one or more posts securing the rail to the ground), stanchion, ram, pier, ballast, post or the like.

A mounting rail 145 is disposed on the torque rail 142 for connecting the solar panel module 102 to the mounting frame 135. The mounting rail 145 is generally orthogonal to the torque rail 142. The mounting rail 145 extends across at least a portion of the length of the solar panel 108. In the illustrated embodiment, the torque rail 142 and mounting rail 145 are rectangular in cross-section. In other embodiments, the torque rail 142 and/or mounting rail 145 has another shaped cross-section, for example, circular (e.g., the torque rail 142 of the embodiment of FIG. 4), triangular, polygonal and the like. The solar array 140 pivots about a rotational axis A that extends through the torque rail 142. The mounting frames 135 illustrated in the present disclosure are exemplary and generally any frame 135 which enables the solar array 140 and clamping system 100 to operate as described herein may be used unless stated otherwise.

Figure 4:
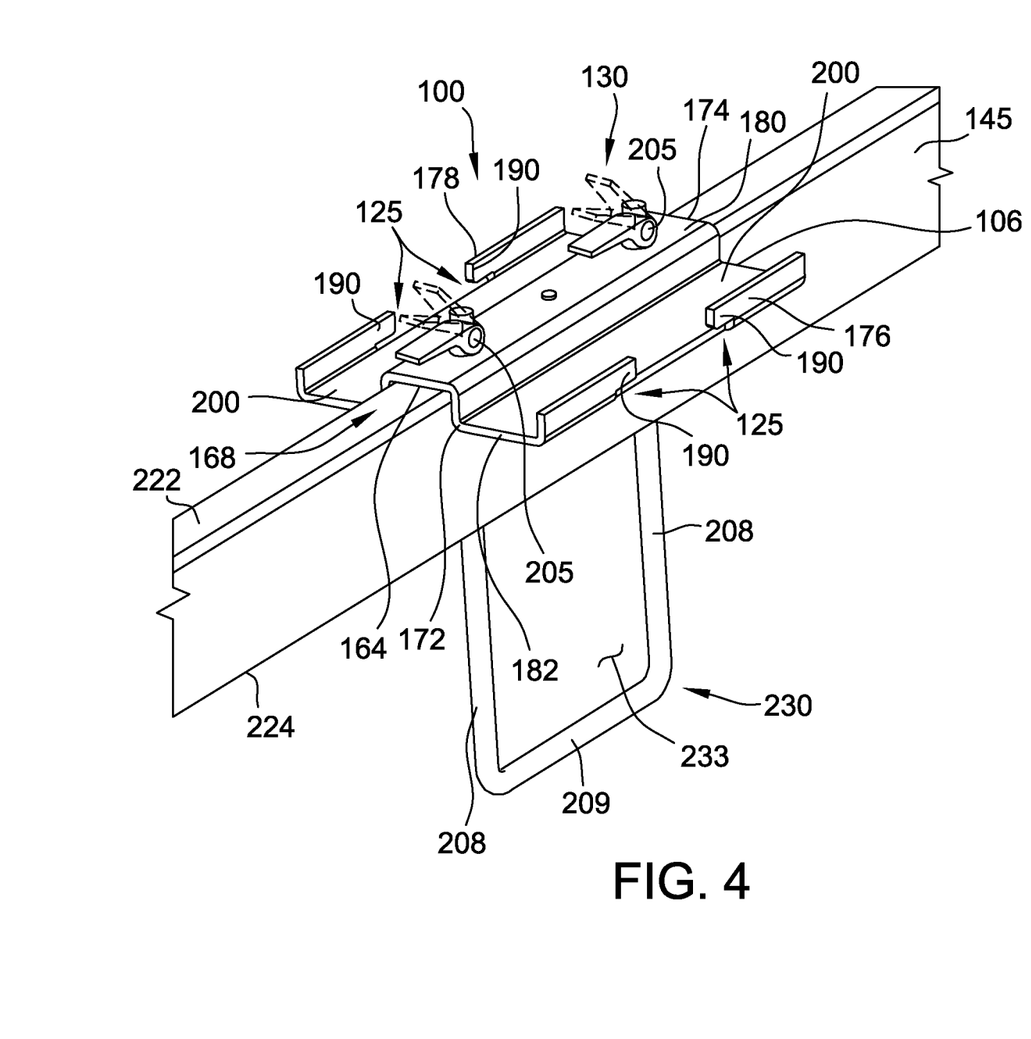
FIG. 4 is a perspective view of the clamping system and a mounting rail.

Referring now to FIG. 4, the clamping system 100 includes a clamp plate 106 that is seated on the mounting rail 145. The clamp plate 106 has a first end 172, second end 174 and first and second sides 176, 178 that extend between the first and second ends 172, 174. The clamp plate 106 also has an upper surface 180 and lower surface 182 opposite the upper surface 180.

Figure 5:
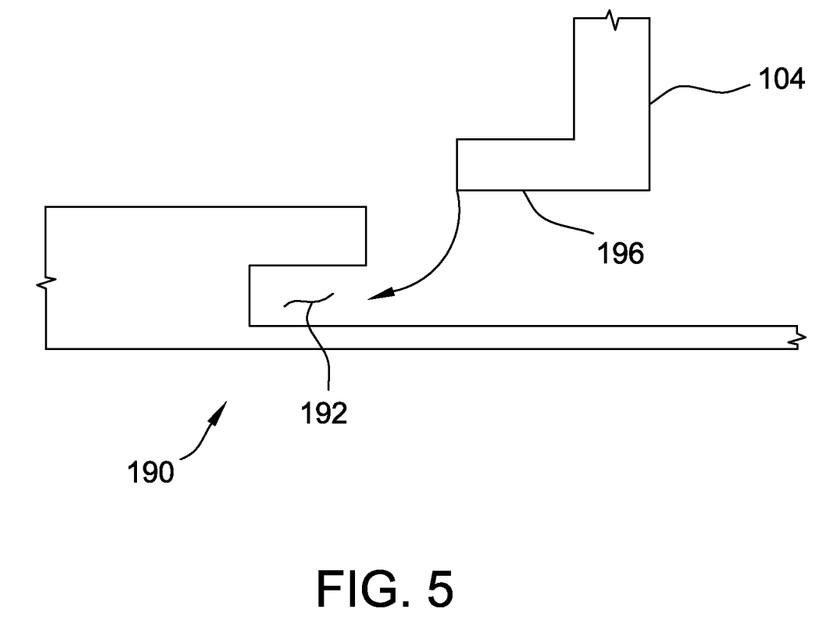
FIG. 5 is a side view of a hook of the clamping system.

The clamp plate 106 includes a rail structure 164 that defines a rail chamber 168 which receives the mounting rail 145. The clamp plate 106 also include one or more hooks 190 that are disposed laterally outward from the rail structure 164 for connecting a solar panel module 102 to the clamp plate 106. Referring now to FIG. 5, each hook 190 includes a slot 192 for receiving a lip 196 of the solar panel module frame 104. Each hook 190 is disposed on a wing 200 of the clamp plate 106. The wings 200 extend laterally outward from the rail structure 164. In the illustrated embodiment, the clamp plate 106 has first and second wings 200 opposite each other. Other embodiments may include a single wing 200 or more than two wings 200.

As shown in the illustrated embodiment, each clamp plate 106 includes four hooks 190 that connect to four different solar panel modules 102 (e.g., first and second hooks may be disposed on the first wing and third and fourth hooks disposed on the second wing). In other embodiments, the clamp plate 106 has more or less hooks 190 for connecting to solar panel modules (e.g., one, two, three, four, five, six or more hooks 190). In some embodiments, the clamp plate 206 include a single hook 190 disposed on each wing 200 (e.g., a first hook disposed on the first wing and a second hook disposed on the second wing). In some embodiments, the clamp plate 206 includes a single wing 200 with one, two or more hooks 190 disposed on the wing 200.

The clamping system 100 includes one or more clamp fasteners 205 for connecting the clamp plate 106 to the frame member (e.g., mounting rail 145). The clamping system 100 may include any number of clamp fasteners 205 to allow the clamping system 100 to function as described herein. In the illustrated embodiment, the clamping system 100 includes first and second clamp fasteners 205.

Figure 6:
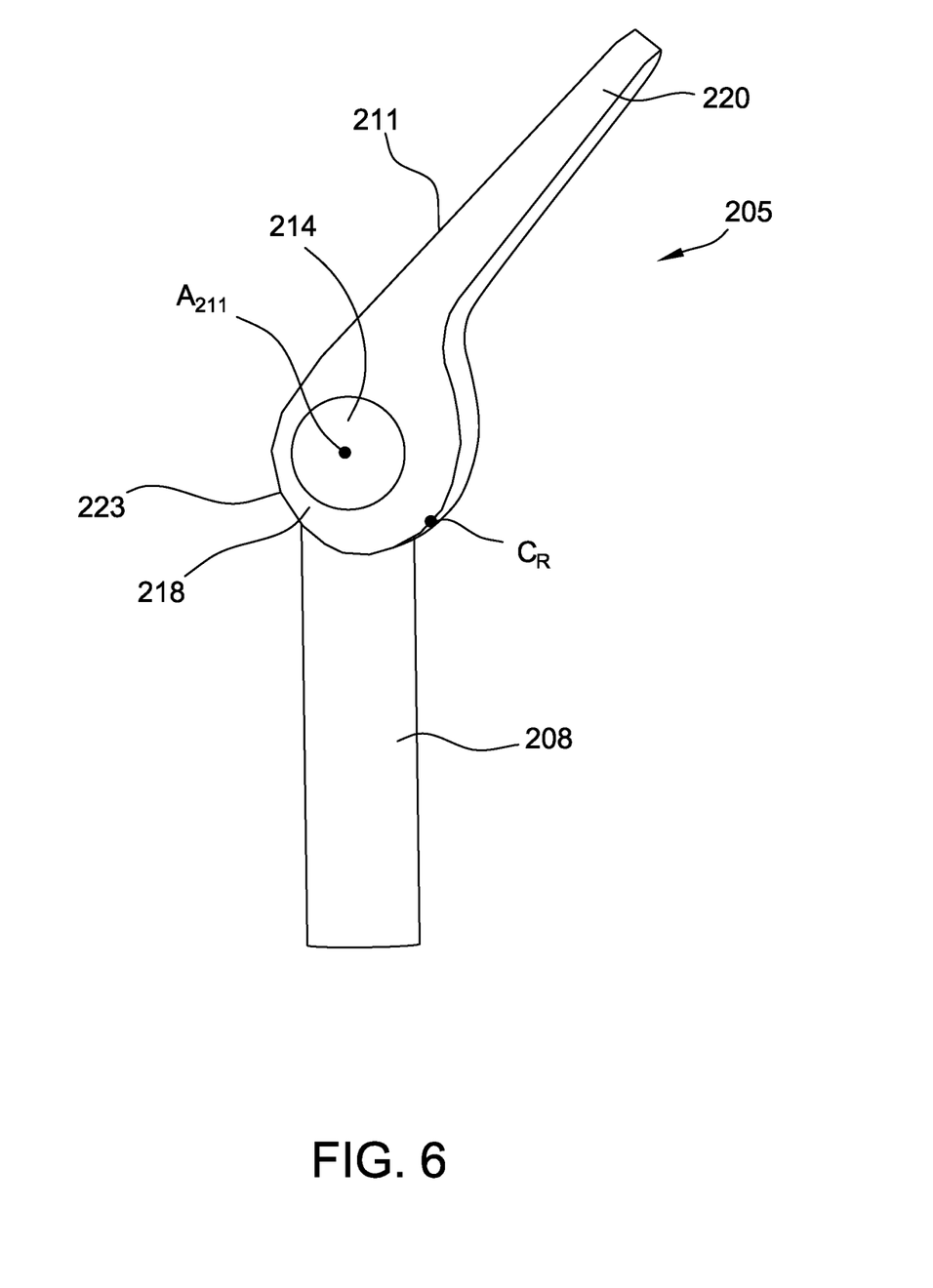
FIG. 6 is a side view of a clamp fastener of the clamping system and the lip of a solar panel module frame.

The illustrated clamp fasteners 205 include a shaft 208 (FIG. 6) that extends through the clamp plate 106 (FIG. 4) and a cam lever 211 connected to the shaft 208. The shaft 208 may at least partially extend through the mounting rail 145. For example and as shown in FIG. 4, the shaft 208 may extend through a top surface 222 and bottom surface 224 of the mounting rail 145. In the illustrated embodiment, two shafts 208 of two clamp fasteners 205 are the legs of the same u-fastener (i.e., u-bolt 230). A connecting rod 209 extends between the legs 208 and the legs 208 and connecting rod form a u-bolt opening 133. The torque rail 142 (FIG. 1) may be received within a u-bolt opening 133 (FIG. 4). The term "u-bolt" should not be considered in limiting sense and generally includes any fastener that forms an opening for receiving another component (e.g., torque rail 142) in the opening.

Figure 7:
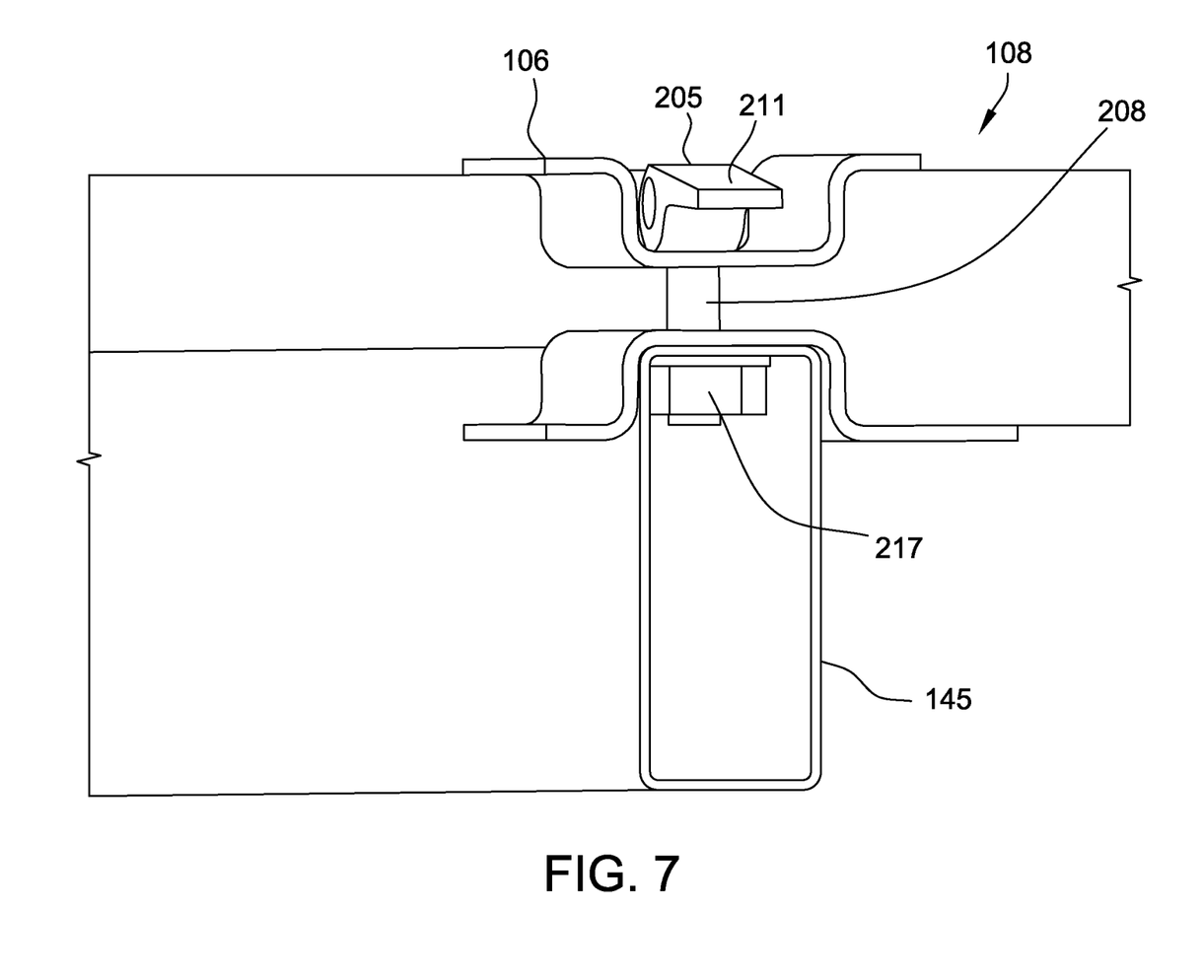
FIG. 7 is a perspective view of another embodiment of a clamp fastener.

In another embodiment and as shown in FIG. 7, the shaft 208 of the clamp fastener 205 only partially extends through the mounting rail 145. The clamp fastener 205 may be connected to the mounting rail 145 in any suitable manner such as by a lock nut 217.

Referring again to FIG. 6, a pivot leg 214 of the clamp fastener 205 is connected to and perpendicular to the shaft 208. The cam lever 211 pivots about a pivot axis $A_{211}$ that extends through the leg 214. The cam lever 211 includes a rounded portion 218 and a handle 220 connected to the rounded portion 218. The rounded portion 218 has an outer edge 223. The outer edge 223 has a crown $C_R$ that is the largest distance from the pivot axis $A_{211}$ to the outer edge 233. To secure the clamp plate 106 to the mounting rail 145 and/or torque rail 142, the handle 210 of the clamp fastener 205 is grasped and moved downward by a user to cause the rounded portion 218 of the cam lever 211 to rotate about the pivot axis $A_{211}$ until the crown $C_R$ contacts the clamp plate 106. The cam lever 211 continues to rotate such that the crown $C_R$ is moved beyond the contact point with the clamp plate 106 which bounds the movement of the cam lever 211. In this locked position, the cam lever 211 exerts a clamping force such that the torque rail 142, mounting rail 145 and clamp plate 106 are clamped or "sandwiched" together. To move the cam lever 211 to the unlocked position, an upward force sufficient to overcome the clamping force is applied to the handle 220. This causes the crown $C_R$ of the rounded portion 218 to move beyond the contact point with the clamp plate 106 which releases the clamping force of the clamp fastener 205. In some embodiments, the clamping system 100 is the only structure used to connect the mounting rail 145 to the torque rail 142.

Figure 10:
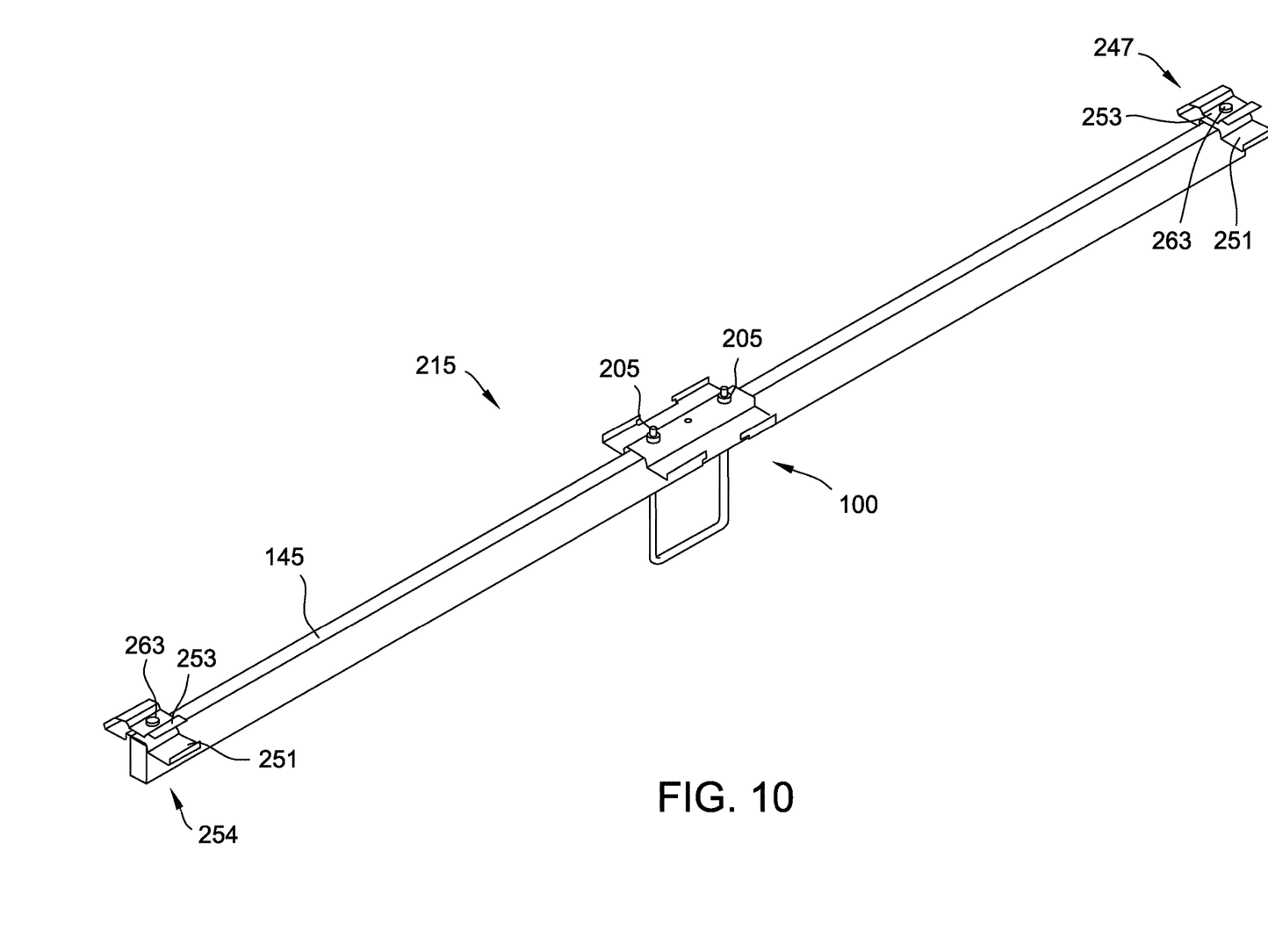
FIG. 10 is a perspective view of a mounting rail, the clamping system and first and second end clamps of a solar panel securement system.

In some embodiments, the fasteners 205 include a nut and bolt such as the fasteners shown in FIG. 10.

To mount the solar panel module 102 to the mounting frame 135, the solar panel module 102 is set on the clamp plate 106 as shown in FIG. 1. The lip 196 of the solar panel module frame 104 is slid into the slot 192 of the hook 190 in the direction shown by the arrow. Before or after the lip 196 is secured in the hook 190, the clamp fasteners 205 are moved from the unlocked position (upper phantom position of the handle in FIG. 4) to the locked position (lower position of handle in FIG. 4) to clamp the clamp plate 106, mounting rail 145 and torque rail 142 together. In this regard, the assembly method described herein is exemplary and other methods to connect the module 102 to the mounting frame 135 may be used unless stated otherwise.

Figure 8:
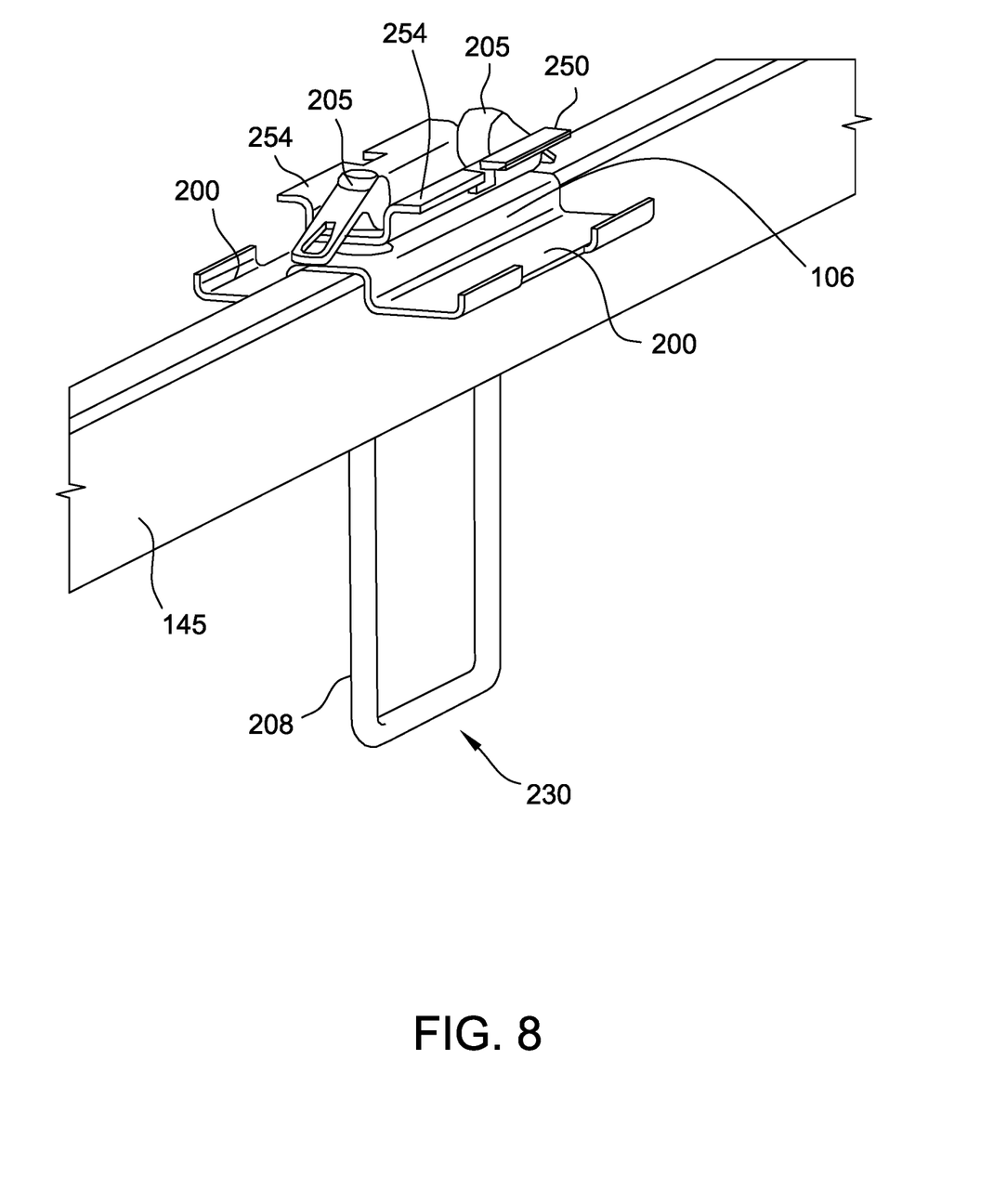
FIG. 8 is a perspective view of a mounting rail and an embodiment of a clamping system having a top plate.

In some embodiments and as shown in FIG. 8, the clamping system 100 may also include a clamp top plate 250 (with the clamp plate 106 in such embodiments being referred to herein as a "clamp bottom plate"). The clamp top plate 250 includes first and second wings 254. Each clamp fastener shaft 208 (i.e., legs of the u-bolt 230) extends through the clamp bottom plate 106 and the clamp top plate 250. When the one or more clamp fasteners 205 are moved to the locked position, the frame 104 of one or more solar panel modules 102 (FIG. 1) is clamped between the first wing 200 of the clamp bottom plate 106 and the first wing 254 of the clamp top plate 250. A frame 104 of one or more solar panel modules 102 is also clamped between the second wing 200 of the clamp bottom plate 106 and the second wing 254 of the clamp top plate 250. In embodiments in which the clamping system 100 includes a clamp top plate 250, the clamp fasteners 205 are moved to the locked position after the solar panel module is set on the clamp bottom plate 106 to enable the solar panel module 102 to be clamped between the clamp bottom plate 106 and the clamp top plate 250.

Figure 9:
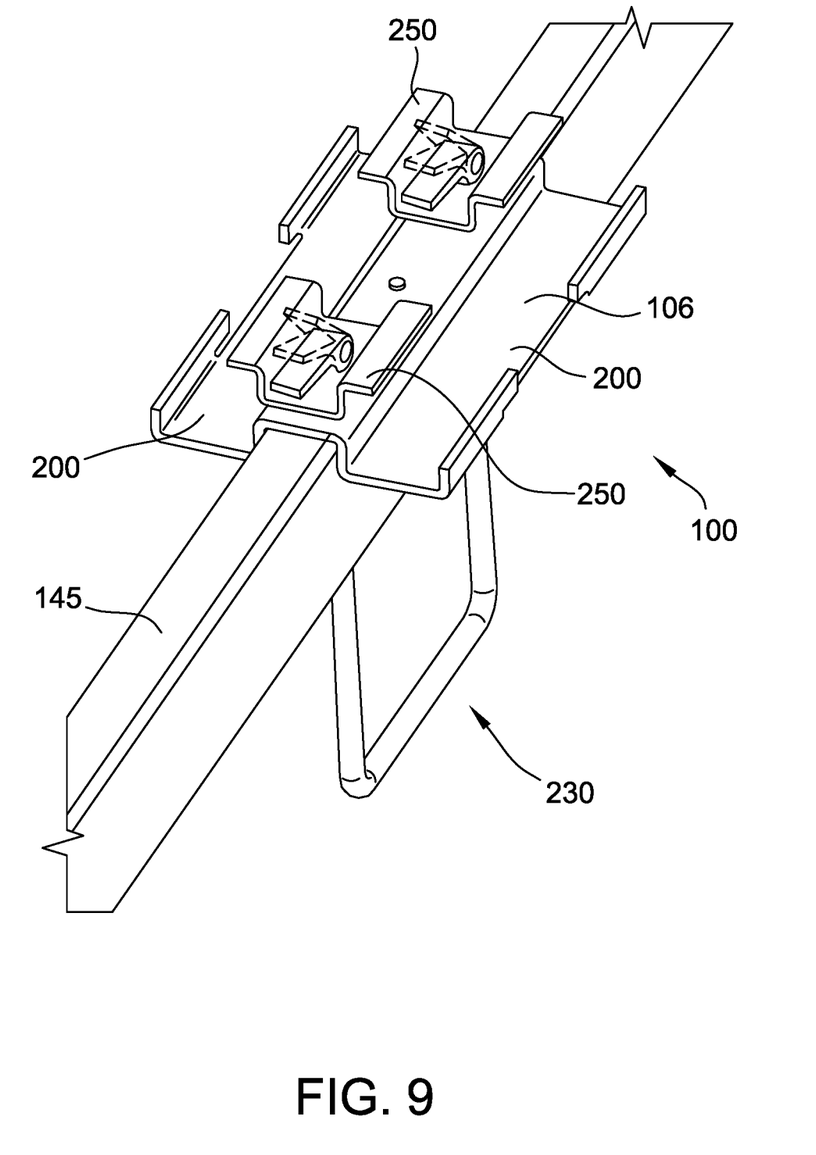
FIG. 9 is a perspective view of a mounting rail and an embodiment of a clamping system having first and second top plates.

Another embodiment of the clamping system 100 is shown in FIG. 9. The system 100 includes a first and second clamp top plate 250. Each clamp fastener shaft 208 (i.e., legs of the u-bolt 230) extends through the clamp bottom plate 106 and one of the clamp top plates 250.

Figure 11:
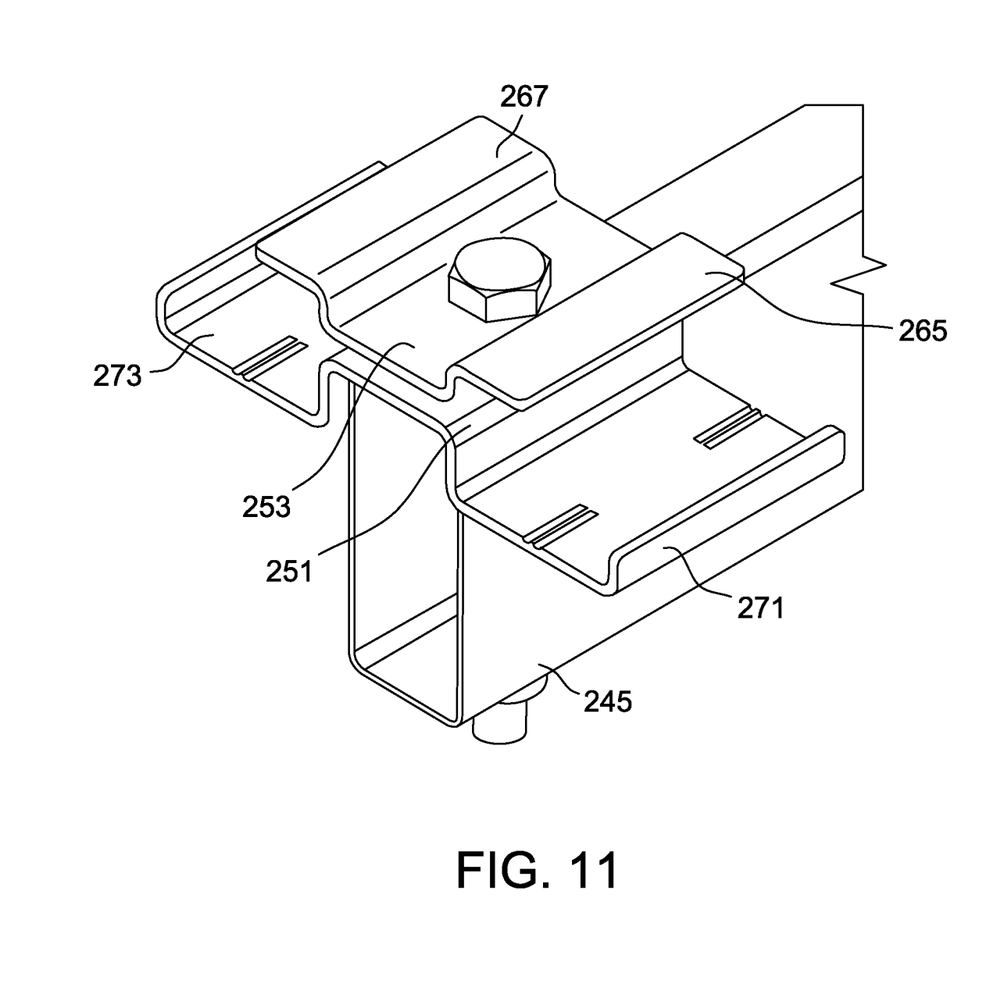
FIG. 11 is a perspective view of an end clamp of the solar panel securement system.

Referring now to FIG. 10, the clamping system 100 described above may be a component of a solar panel module securement system 215 (in which case it may be referred to as a "center clamp" 210). The solar panel securement system 215 may also include first and second end clamps 245, 247 for securing the solar panel module 102. Each end clamp 245, 247 may include a bottom plate 251, a top plate 253 and a fastener 263 for clamping the solar panel modules 102 between the bottom plate 251 and the top plate 253. The fastener 263, for example, may be a bolt and nut as shown in FIG. 10 or may be the clamp fastener 205 shown in FIG. 6. The top plate 253 (FIG. 11) includes first and second wings 265, 267 and the bottom plate 251 also includes first and second wings 271, 273. A solar panel module 102 may be secured between the first wings 265, 271 of the bottom and top plates 251, 253 and a second solar panel module 102 may be secured between the second wings 265, 267 of the bottom and top plates 251, 253. The solar panel securement system 215 may be connected to four solar panels (two on each side of the mounting rail 145 with a panel connected to each of the four hooks 190 (FIG. 1) of the clamping system 100).

Compared to conventional mounting systems for securing one or more solar panel modules of a solar array, the mounting systems of embodiments of the present disclosure have several advantages. By using a clamping system having hooks (e.g., slotted hooks), solar panel modules may be more easily connected to the mounting frame. For example, in some embodiments, the solar panel module may be connected without tools and/or by a single user. The fasteners of the clamping system may connect the mounting rail to a torque tube and also connect the clamping system to the mounting rail (i.e., without additional fasteners to connect the mounting rail to the torque tube). The mounting system may include fewer components which reduces manufacturing costs and eases installation by a user. The clamping system may be connected to the mounting rail before field installation of the array (e.g., pre-assembled such as at the site of manufacture) which reduces the number of parts (e.g., separate fasteners) an installer would carry in the field and the tools used to lock the module onto the mounting frame.

As used herein, the terms "about," "substantially," "essentially" and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing[s] shall be interpreted as illustrative and not in a limiting sense.

What is claimed is:

1. A mounting system for securing a solar array that comprises one or more solar panel modules, the mounting system comprising:
   a frame member;
   a clamp plate comprising:
      a rail structure that defines a rail chamber, the frame member being received in the rail chamber; and
      a hook disposed laterally outward from the rail structure for connecting the solar panel module;
      a first clamp fastener that connects the clamp plate to the frame member; and
      a second clamp fastener that connects the clamp plate to the frame member.

2. The mounting system as set forth in claim 1 wherein the clamp plate comprises a wing that extends laterally outward from the rail structure for receiving the solar panel module, the hook being disposed on the wing.

3. The mounting system as set forth in claim 2 wherein the wing is a first wing and the hook is a first hook, the clamp plate further comprising:
   a second wing that extends laterally outward from the rail structure and opposite the first wing for receiving a second solar panel module; and
   a second hook disposed on the second wing for connecting a second solar panel module.

4. The mounting system as set forth in claim 2 wherein the hook is a first hook, the clamp plate further comprising a second hook disposed on the first wing for connecting a second solar panel module.

5. The mounting system as set forth in claim 1 wherein the clamp plate is a clamp bottom plate, the mounting system further comprises a clamp top plate for clamping the solar panel module between the clamp bottom plate and the clamp top plate.

6. The mounting system as set forth in claim 1 in combination with a solar panel module, the solar panel module being at least partially disposed within the hook to secure the solar panel module to the frame member.

7. A mounting system for securing a solar array that comprises one or more solar panel modules, the mounting system comprising:
   a mounting frame for supporting the solar array, the mounting frame comprising:
      a torque rail;
      a mounting rail orthogonal to the torque rail, the torque rail and mounting rail being separate from a solar panel module, the torque rail and mounting rail being vertically offset with the mounting rail extending across the torque rail;
   a clamping system for connecting one or more solar panel modules to the mounting frame, the clamping system comprising:
      a clamp plate comprising:
         a rail structure that defines a rail chamber, the mounting rail being received in the rail chamber; and
         a hook disposed laterally outward from the rail structure for connecting a solar panel module.

8. The mounting system as set forth in claim 7 in combination with a solar panel module, the module having a lip at least partially received in a slot of the hook.

9. The mounting system as set forth in claim 7 in combination with a solar panel module, the solar panel module being at least partially disposed within the hook to secure the solar panel module to the mounting frame.

10. The mounting system as set forth in claim 7 wherein the clamp plate is a clamp bottom plate, the clamping system further comprises a clamp top plate for clamping the solar panel module between the clamp bottom plate and the clamp top plate.

11. The mounting system as set forth in claim 10 wherein the clamp top plate is a first clamp top plate, the clamping system further comprising:
   a second clamp top plate for clamping a second solar panel module between the clamp bottom plate and the clamp top plate; and
   a u-bolt that defines a u-bolt opening, the torque rail being disposed within the u-bolt opening, the u-bolt comprising a first leg and a second leg, the first leg of the u-bolt extending through the first clamp top plate and the second leg of the u-bolt extending through the second clamp top plate.

12. The mounting system as set forth in claim 11 wherein the first leg and the second leg extend through the mounting rail.

* * * * *